US010388927B2

(12) United States Patent
Motokawa et al.

(10) Patent No.: US 10,388,927 B2
(45) Date of Patent: Aug. 20, 2019

(54) BATTERY UNIT

(71) Applicant: Panasonic Intellectual Property Management Co., Ltd., Osaka-shi, Osaka (JP)

(72) Inventors: Shinya Motokawa, Osaka (JP); Takuya Nakashima, Osaka (JP); Hiroshi Takasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 395 days.

(21) Appl. No.: 14/908,347

(22) PCT Filed: Jul. 18, 2014

(86) PCT No.: PCT/JP2014/003827
§ 371 (c)(1),
(2) Date: Jan. 28, 2016

(87) PCT Pub. No.: WO2015/019559
PCT Pub. Date: Feb. 12, 2015

(65) Prior Publication Data
US 2016/0211497 A1    Jul. 21, 2016

(30) Foreign Application Priority Data

Aug. 8, 2013  (JP) .................................. 2013-165447

(51) Int. Cl.
*H01M 2/12*    (2006.01)
*H01M 2/10*    (2006.01)
(Continued)

(52) U.S. Cl.
CPC ............. *H01M 2/12* (2013.01); *H01M 2/105* (2013.01); *H01M 2/1077* (2013.01);
(Continued)

(58) Field of Classification Search
CPC ...... H01M 2/105; H01M 2/1077; H01M 2/12; H01M 2/1252
(Continued)

(56) References Cited

U.S. PATENT DOCUMENTS

| 2011/0117401 | A1 | 5/2011 | Lee et al. |
| 2012/0164490 | A1* | 6/2012 | Itoi ................... H01M 2/105 429/7 |
| 2012/0263982 | A1 | 10/2012 | Yasui et al. |

FOREIGN PATENT DOCUMENTS

| JP | 2009170258 A | 7/2009 |
| JP | 2009238644 A | 10/2009 |

(Continued)

OTHER PUBLICATIONS

International Search Report for corresponding Application No. PCT/JP2014/003827; dated Nov. 4, 2014; with English translation.
(Continued)

*Primary Examiner* — Basia A Ridley
*Assistant Examiner* — James M Erwin
(74) *Attorney, Agent, or Firm* — Cantor Colburn LLP

(57) ABSTRACT

Provided is a battery unit capable of reducing the size of vehicle installation space by being more compact. A battery unit equipped with: a plurality of battery modules each containing a plurality of battery cells which are connected in parallel with one another, and each having a duct chamber for discharging gas emitted by the battery cells; and a fixing member for fixing the plurality of battery modules to the wall of a storage case in a manner such that the modules are integrally assembled with one another. The fixing member has an attachment part which attaches to a module case, and the attachment part includes an exhaust duct part for collecting and discharging the gas emitted into the duct chamber of each battery module.

5 Claims, 6 Drawing Sheets

(51) Int. Cl.
  *H01M 10/6554* (2014.01)
  *H01M 10/46* (2006.01)
  *H01M 2/20* (2006.01)

(52) U.S. Cl.
  CPC ......... *H01M 2/1252* (2013.01); *H01M 10/46* (2013.01); *H01M 10/6554* (2015.04); *H01M 2/206* (2013.01); *H01M 2220/20* (2013.01)

(58) Field of Classification Search
  USPC .......................................................... 429/82
  See application file for complete search history.

(56) References Cited

FOREIGN PATENT DOCUMENTS

| | | | |
|---|---|---|---|
| JP | 2010251019 | A | 11/2010 |
| JP | 2011108653 | A | 6/2011 |
| JP | 012227120 | A | 11/2012 |
| WO | 2012073438 | A1 | 6/2012 |

OTHER PUBLICATIONS

International Preliminary Report on Patentability and Written Opinion of the International Searching Authority corresponding to Application No. PCT/JP2014/003827; dated Feb. 9, 2016, with English translation.
Notification of Transmittal of the International Preliminary Report on Patentability and its translation corresponding to Application No. PCT/JP2014/003827; dated Feb. 18, 2016.
Second and Supplementary Notice Informing the Applicant of the Communication of the International Application corresponding to Application No. PCT/JP2014/003827; dated Dec. 10, 2015.

* cited by examiner

BATTERY UNIT

This is the U.S. national stage of application No. PCT/JP2014/003827, filed on Jul. 18, 2014. Priority under 35 U.S.C. § 119(a) and 35 U.S.C. § 365(b) is claimed from Japanese Application No. 2013-165447, filed Aug. 8, 2013, the disclosure of which is also incorporated herein by reference.

TECHNICAL FIELD

The present invention relates to a battery unit that is installed in a movable body such as a motor-driven vehicle, for example.

BACKGROUND ART

Conventionally, for example, Patent Literature 1 discloses a power supply apparatus for vehicles. The power supply apparatus includes a battery block including a plurality of unit batteries that are provided with safety valves, an exhaust duct that is coupled with opening parts of the safety valves of the unit batteries constituting the battery block and that ejects ejection matter from the opened safety valves, and control devices that are connected with the battery block and that control the charge and discharge of the unit batteries. In the battery block, the unit batteries are arrayed such that the opening parts of the safety valves are positioned on an identical plane. Further, in the power supply apparatus, the control devices are provided so as to face the safety valve opening plane of the battery block on which the opening parts of the safety valves are positioned. Furthermore, in the power supply apparatus, the exhaust duct is arranged between the control devices and the safety valve opening plane, and the exhaust duct thermally insulates the control devices from the battery block. Patent Literature 1 describes that, according to such a power supply apparatus, it is possible to reduce the external shape and increase the output of the battery block, and thus arrange the control devices such that they are thermally insulated from the heat of the battery block.

CITATION LIST

Patent Literature

Patent Literature 1: JP 2009-238644A

SUMMARY OF INVENTION

Technical Problem

The power supply apparatus for vehicles described in the above Patent Literature 1 is fixed to a chassis frame that forms a vehicle with a frame structure. However, the exhaust duct of the power supply apparatus and the attachment structure of the power supply apparatus to the vehicle are provided as separate structures, and in this regard, there is room for improvement aimed at further downsizing.

Solution to Problem

A battery unit according to the present invention is a battery unit including: a plurality of battery modules each of which includes a plurality of battery cells connected with each other in parallel and each of which has a duct chamber to exhaust gas emitted from each battery cell; and a fixation member that fixes the plurality of battery modules to a wall part of a storage case while the plurality of battery modules are integrally combined, in which the fixation member has a first attachment part that is attached to the storage case, and the first attachment part includes an exhaust duct for collecting and exhausting the gas emitted into the duct chamber of each battery module.

Advantageous Effects of Invention

According to the battery unit in the present invention, the fixation member, which fixes the battery unit including the plurality of battery modules to the wall part of the storage case, has a fixation function for the plurality of battery modules and an exhaust function for the gas emitted from the battery cells. As a result, compared to the case where these functions are implemented in separate structures, it is possible to reduce the size of the battery unit, and it is therefore possible to achieve space saving when it is installed in a vehicle in which the installation space is limited.

DESCRIPTION OF EMBODIMENTS

Hereinafter, embodiments according to the present invention will be described in detail, with reference to the accompanying drawings. In the description, specific shapes, materials, numerical values, directions and the like are examples for facilitating the understanding of the present invention, and may be appropriately altered according to usage, purpose, specification and the like. Further, hereinafter, in the case of including a plurality of embodiments, modifications and the like, it is considered from the beginning to use the characteristic parts by appropriately combining them.

Figure 1:
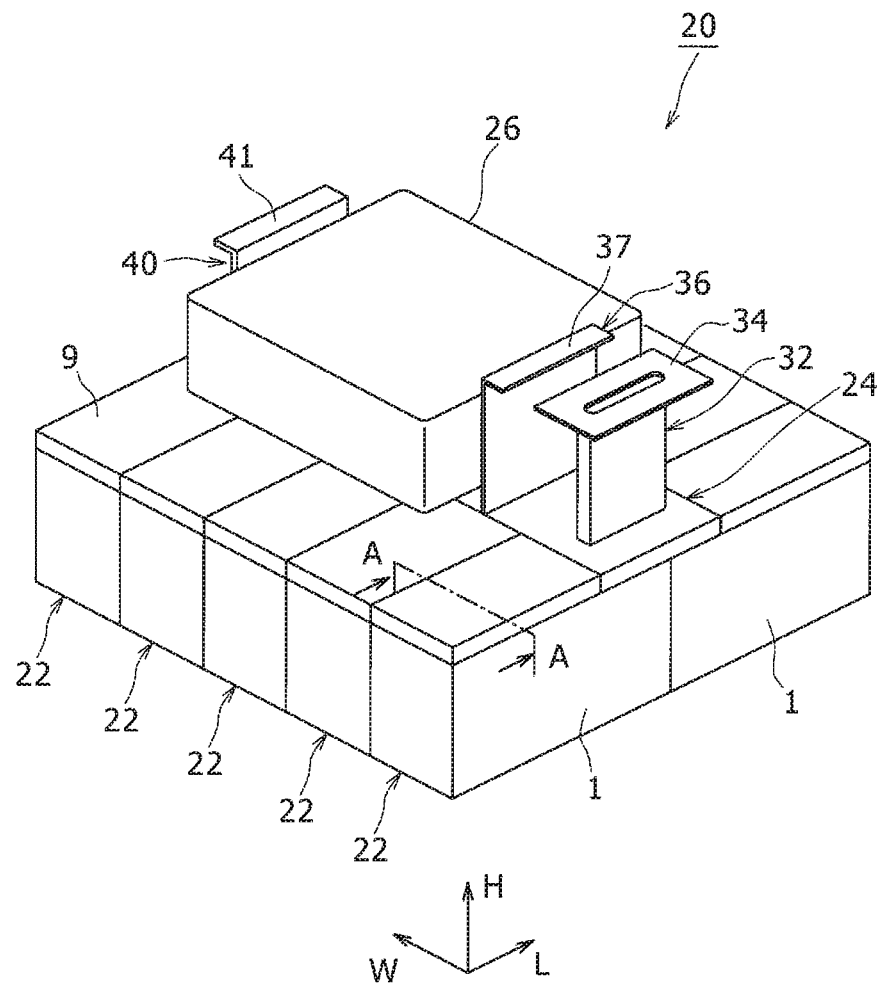
FIG. 1 is a perspective view showing the whole of a battery unit.
Figure 2:
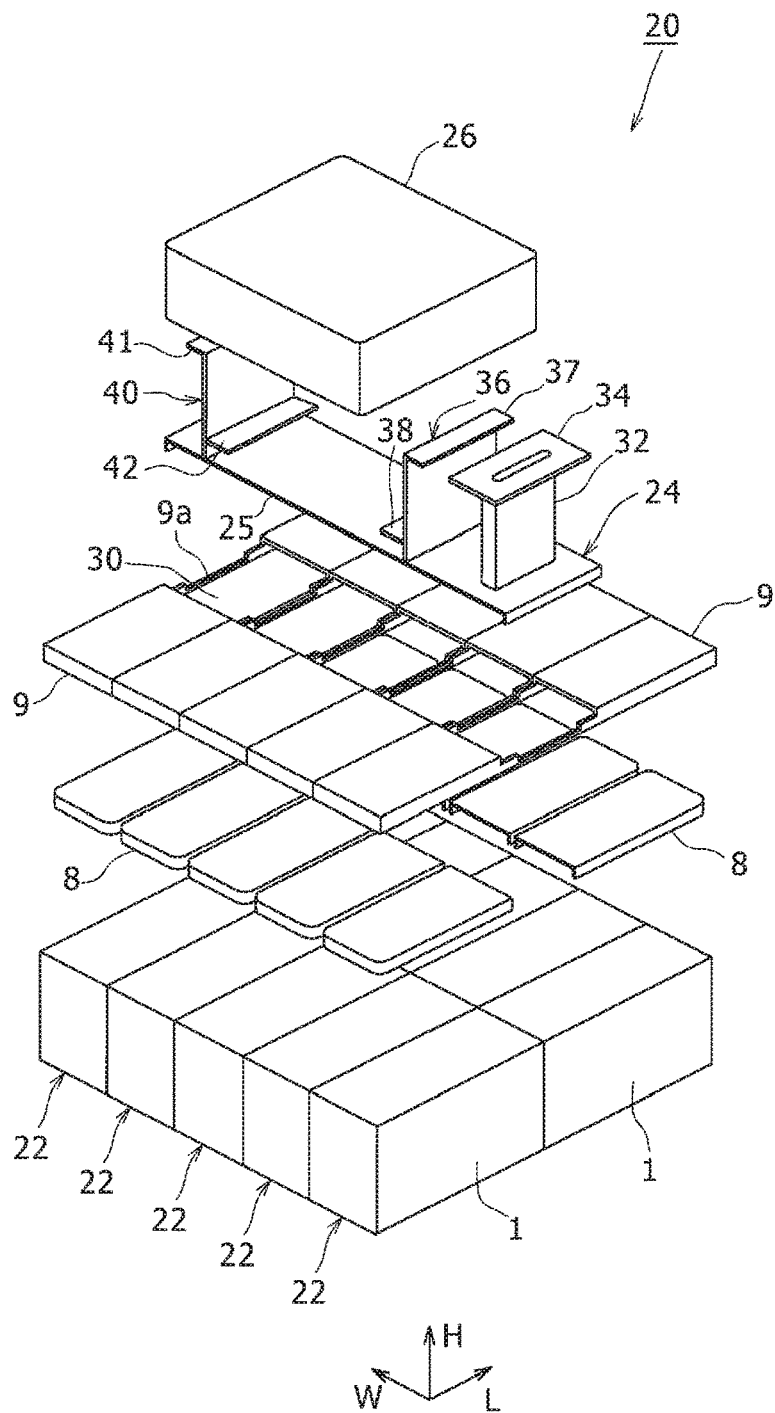
FIG. 2 is an exploded perspective view of the battery unit in FIG. 1.
Figure 3:
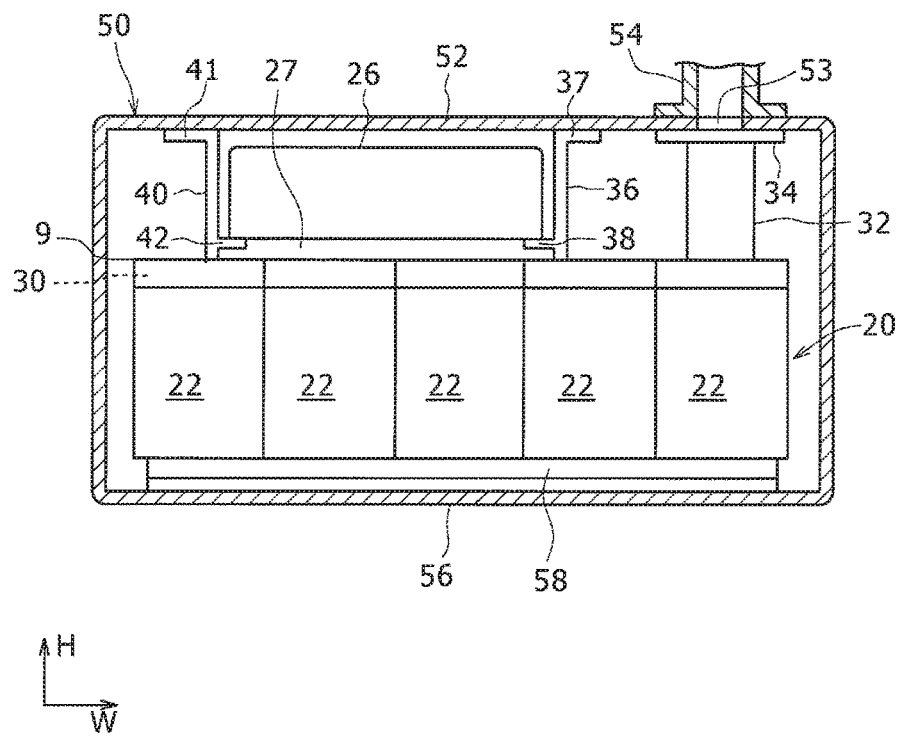
FIG. 3 is a side view showing a state in which the battery unit in FIG. 1 is stored and fixed in a module case and partially containing a section of the module case.

FIG. 1 is a perspective view showing the whole of a battery unit 20 that is an embodiment of the present invention. FIG. 2 is an exploded perspective view of the battery unit 20 in FIG. 1. Further, FIG. 3 is a side view showing a state in which the battery unit 20 in FIG. 1 is stored and fixed in a module case (storage case) 50 and partially containing a section of the module case 50. In FIG. 1 and FIG. 2, a height direction H, a length direction L and a width direction W are shown as three axis directions orthogonal to each other. The height direction H is the vertical direction or perpendicular direction when the battery unit 20 is placed on a horizontal plane. Further, the length direction L and the width direction W are directions orthogonal to each other on the horizontal plane. Here, in the dimensions of a battery module 22 included in the battery unit 20, the longer direction is the length direction L, and the shorter direction is the width direction W. The same goes for the following figures.

With reference to FIG. 1 and FIG. 2, the battery unit 20 includes a plurality of battery modules 22, a fixation member 24 and an electric component storage case 26. In the embodiment, five battery modules 22 are integrally combined while being arrayed and arranged, and thereby constitute the battery unit 20. Here, the number of the battery modules 22 to constitute the battery unit 20 is not limited to five described above, and is appropriately altered depending on the output and capacity required for the battery unit 20.

Each battery module 22 is configured by connecting, in series or in parallel, a plurality of battery blocks 1 (see FIG. 4) in which a plurality of battery cells 2 (see FIG. 4) as the minimum unit of the battery constituting the battery unit 20 are connected in parallel. In the embodiment, for example, two battery blocks 1 are connected in series, to this constitute the battery module 22. However, the number of the battery blocks 1 to be included in the battery module 22 can be appropriately altered depending on the output and capacity required for the battery unit 20, and may be three or more.

Figure 4:
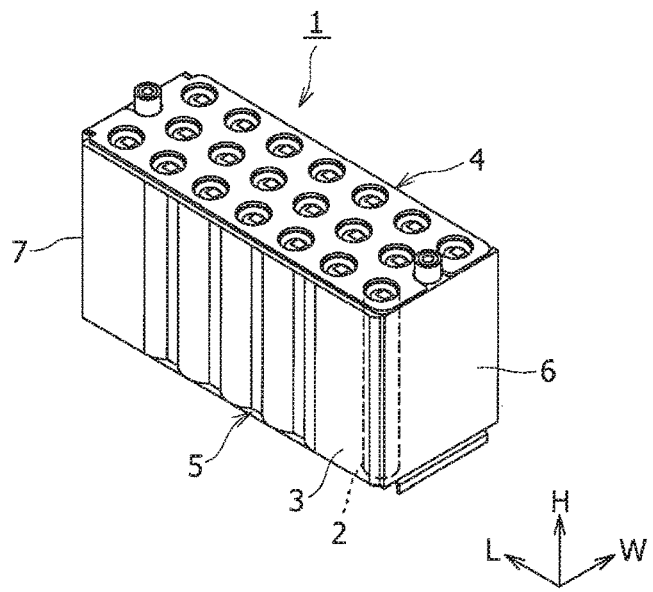
FIG. 4 is a perspective view of a battery block constituting the battery unit.
Figure 5:
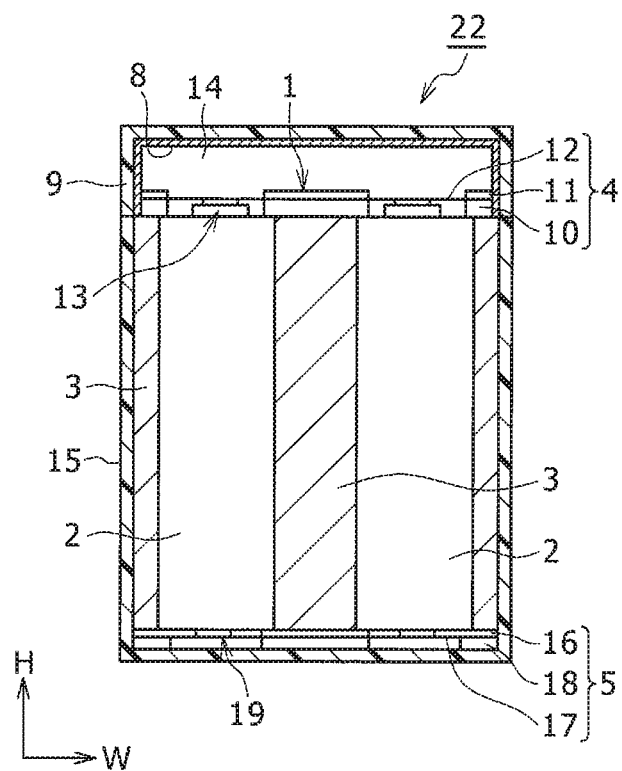
FIG. 5 is a sectional view taken from line A-A in FIG. 1.

Here, the configuration of the battery block 1 is described with reference to FIG. 4 and FIG. 5. FIG. 4 is a perspective view showing a battery block 1 included in each of the plurality of battery modules 22 that constitute the battery unit 20. Further, FIG. 5 is a sectional view of one battery module 22 that constitutes the battery unit 20, taken from line A-A in FIG. 1.

As described above, each battery module 22 of the battery unit 20 in the embodiment includes two battery blocks 1 shown in FIG. 4 that are connected in series. In the battery block 1, a plurality of battery cells 2 are connected in parallel such that a predetermined capacity is obtained. Here, an example in which 20 battery cells 2 are used is shown. In the battery block 1, the 20 battery cells 2 are arrayed and arranged in a predetermined arrangement such that the positive electrode sides are ordered on one side and the negative electrode sides are ordered on the other side, and the battery cells 2 are stored and held in a battery cell case 3. Further, a positive electrode side collector unit 4 is arranged on the positive electrode side, a negative electrode side collector unit 5 is arranged on the negative electrode side, and the positive electrode side collector unit 4 and the negative electrode side collector unit 5 are fastened through holders 6, 7, by an appropriate fastening member or the like.

The battery cell 2 is a secondary battery capable of performing the charge and discharge, which is the minimum unit of the battery constituting the battery unit 20. As the secondary battery, a lithium-ion battery is used. Other than this, a nickel-metal hydride battery, an alkali battery or the like may be used. The 20 battery cells 2 included in the battery block 1 have a zigzag arrangement that minimizes the clearance between adjacent batteries, with three battery arrays being arranged in the width direction W, and seven, six and seven battery cells 2 being arranged along the length direction L of the battery arrays.

The battery cell 2 has a cylindrical external shape. One end of both end parts of the cylindrical shape is used as the positive electrode terminal, and the other end is used as the negative electrode terminal. In the embodiment, the positive electrode terminal is provided on the upper end of the battery cell 2 shown in FIG. 5, and the negative electrode terminal is provided on the lower end. As an example of each battery cell 2, there is a lithium-ion battery in which the diameter is 18 mm, the height is 65 mm, the voltage between the terminals is 3.6 V and the capacity is 2.5 Ah. This is an example for description, and dimensions or characteristic values other than this may be adopted. Here, the battery cell 2 is not limited to a cylindrical battery, and may be a battery having another external shape, for example, a square battery.

The battery cell 2 has a safety valve 13 on the positive electrode terminal side. The safety valve 13 has a function to release exhaust gas from the interior of the battery to the interior when the pressure of the gas generated by an electrochemical reaction that is performed in the interior of the battery cell 2 exceeds a previously determined threshold pressure.

The battery cell case 3 is a holding container to hold the 20 battery cells 2 such that they are arrayed and arranged in a predetermined arrangement. The battery cell case 3 is a frame body having the same height as the height of the battery cell 2 and provided with 20 through-hole shaped battery storage parts that are opened on each of both end sides in the height direction H, and each battery cell 2 is stored and arranged in one of the battery storage parts.

The arrangement of the battery storage parts has a zigzag arrangement corresponding to the arrangement of the battery cells 2. That is, three battery storage part arrays are arranged in the width direction W, and the battery storage part arrays have seven, six and seven battery storage parts along the length direction L, respectively. As the battery cell case 3, there can be used a battery cell case that adopts aluminum as the main material and that has a predetermined shape formed by extrusion molding.

In the battery cell case 3, when the 20 battery cells 2 are stored and arranged in the battery storage parts, the positive electrode sides of the battery cells 2 are ordered on one side, and the negative electrode sides are ordered on the other side. In FIG. 5, the one side is the upper side along the height direction H on the sheet plane, and the other side is the lower side along the height direction H on the sheet plane.

The positive electrode side collector unit 4 is a connection member that is arranged so as to close the opening on one side of the battery cell case 3 and that electrically connects the respective positive electrode sides of the arrayed and arranged battery cells 2. The positive electrode side collector unit 4 is constituted by a positive electrode side insulating plate 10, a positive electrode collector 11 and a positive electrode plate 12.

The positive electrode side insulating plate 10 is a plate member that is arranged between the battery cell case 3 and the positive electrode collector 11 and positive electrode plate 12, and that insulates them electrically. The positive electrode side insulating plate 10 is provided with 20 openings that have a circular shape or the like and that allow the positive electrodes of the battery cells 2 to protrude. As the positive electrode side insulating plate 10, there is used a plastic article or plastic sheet that has a predetermined heat resistance property and electrical insulation property, and that is processed in a predetermined shape.

The positive electrode collector 11 is a thin plate including 20 electrode contact parts that are arranged in a positional relation in which they contact with the positive electrodes of the battery cells 2 respectively and individually. As the positive electrode collector 11, there can be used a metal thin plate having an electrically conductive property and forming electrode contact parts, each of which has a predetermined shape and in each of which a roughly C-shaped cutout part is formed at the periphery by etching, press processing or the like.

The positive electrode plate 12 is an electrode plate that is electrically connected with the positive electrode collector 11 and that mutually connects the 20 electrode contact parts to configure one positive electrode side output terminal. As the positive electrode plate 12, there can be used a metal thin plate having an electrically conductive property and having an appropriate thickness and strength. As the positive electrode plate 12, there can be used a metal thin plate forming electrode contact parts, each of which has a predetermined shape and in each of which an opening having a circular shape or the like is formed by etching, press processing or the like.

The negative electrode side collector unit 5 is a connection member that is arranged at the opening on the other side of the battery cell case 3 and that electrically connects the respective negative sides of the arrayed and arranged battery cells 2. The negative electrode side collector unit 5 is constituted by a negative electrode side insulating plate 16, a negative electrode collector 17 and a negative electrode plate 18.

The negative electrode side insulating plate 16 is a plate member that is arranged between the battery cell case 3, and the negative electrode collector 17 and negative electrode plate 18, and that insulates them electrically. The negative electrode side insulating plate 16 is provided with 20 openings that have a circular shape or the like and that expose the negative electrodes of the battery cells 2. As the negative electrode side insulating plate 16, there is used a plastic article or plastic sheet that has a predetermined heat resistance property and electrical insulation property, and that is processed in a predetermined shape.

The negative electrode collector 17 is an electrode member including 20 electrode contact parts that are arranged in a positional relation in which they individually contact each of the negative electrodes of the battery cells 2. As the negative electrode collector 17, there can be used a metal thin plate having an electrically conductive property and forming electrode contact parts having a predetermined shape by etching, press processing or the like. Further, the electrode contact part of the negative electrode collector 17 may be provided with a current breaking element that fuses when overcurrent flows through the battery cell 2 causing the temperature to exceed a previously determined threshold temperature.

The negative electrode plate 18 is an electrode plate that is electrically connected with the negative electrode collector 17 and that mutually connects the 20 respective electrode contact parts to constitute one negative electrode side output terminal. As the negative electrode plate 18, there can be used a metal thin plate having an electrically conductive property, having an appropriate thickness and strength, and forming electrode contact parts, each of which has a predetermined shape and in each of which an opening having a circular shape or the like is formed by etching, press processing or the like.

The holders 6, 7 are members for fastening the positive electrode side collector unit 4 arranged on one side of the battery cell case 3 and the negative electrode side collector unit 5 arranged on the other side with use of a fastening member such as a bolt, for example, and integrating the battery cell case 3, the positive electrode side collector unit 4 and the negative electrode side collector unit 5 as a whole, and is composed of an insulating material.

Two battery blocks 1 having the above configuration are prepared and laterally arranged, and a pointed end part of the positive electrode plate 12 of the battery block 1 on one side and a pointed end part of the negative electrode plate 18 of the battery block 1 on the other side are connected with each other electrically and mechanically, by a connection fixation method such as welding. Thereby, the battery module 22 is formed.

As shown in FIG. 5, the battery module 22 is contained in, for example, a case member 15 made of resin that is opened upward. Further, the upper part of the battery module 22 is covered with cover members 8, 9. On the inside of the cover members 8, 9, a duct chamber 14 that is a space is formed. The duct chamber 14 faces, through the openings and the cutout parts, the positive electrode terminals of the battery cells 2 that are provided with the safety valves 13. Thereby, with this configuration, when the safety valve 13 of the battery cell 2 acts, the gas emitted from the battery cell 2 flows into the duct chamber 14.

The cover member 8 is arranged on the inside of the cover member 9. The cover member 8 is formed, for example, of a metal material having a relatively high heat resistance property. As a result, it is configured so as not to deform and melt even when being exposed to the high-temperature (for example, about 400° C.) gas emitted from the battery cell 2. On the other hand, the cover member 9 is arranged so as to cover the outside of the cover member 8. The cover member 9 is formed, for example, of a resin material having a relatively low heat resistance property.

The cover members 8, 9 are fixed on the upper surface of the battery cell case 3 of the battery block 1 included in the battery module 22, by appropriate fastening means such as bolts, screws or rivets, for example. As a result, the gas emitted from the battery cell 2 does not leak from between the battery module 22 and the cover members 8, 9.

With reference to FIG. 1 to FIG. 3, the cover member 8 covering the upper part of the battery module 22 and forming the duct chamber 14 is divided into two, for one battery module 22, and they are arranged on both end sides of the battery module 22 with respect to the length direction L. On the other hand, the cover member 9 provided so as to cover the outside of the cover member 8 is formed as one member for one battery module 22, and has a part where an opening part is formed on the upper part of the center in the length direction L, and coupling ribs 9a are thinly formed by performing the cutout in a roughly rectangular shape.

Since the cover members 8, 9 are formed in this way, when they are mounted on the upper part of each battery module 22 of the battery unit 20, there is formed a collection duct part 30 that is communicated with the duct chamber 14 of each battery module 22 and that is a space extending in the width direction W of the battery unit 20, at the central part in the length direction L of the battery unit 20.

Here, it has been described above that the two cover members 8, 9 are arranged on the upper parts of the battery module 22 for forming the duct chamber 14. However, without being limited to this, for example, the inside cover member 8 may be omitted, and the outside cover member 9 may then be formed of a metal material having a relatively high heat resistance property.

As shown in FIG. 3, the fixation member 24 has a function to fix the battery unit 20 to a wall part of the module case 50, and an exhaust function to release the gas generated from the battery cell 2 of the battery unit 20, to the exterior of the module case 50. Further, the fixation member 24 is fixed, by bolts or the like, across the respective battery modules 22 constituting the battery unit 20, and therefore has a function to bind and fix the respective battery modules 22 while they are integrally combined.

The fixation member 24 includes a flat plate part 25 that is provided so as to cover the upper side of the collection duct part 30 of the battery unit 20, and an exhaust duct part 32, a first attachment part 36 and a second attachment part 40, each of which is provided upright so as to protrude from the upper surface of the flat plate part 25. Further, the fixation member 24 is formed by a metal plate of a material having a good heat transfer property. However, without being limited to this, the fixation member 24 may be formed of a resin material in which the heat transfer property has been improved by mixture with a filler such as silica or metal powder, for example.

The fixation member 24 is coupled across the plurality of (in the embodiment, five) battery modules 22, so as to cover the opening parts respectively formed on the cover members 9 of the battery modules 22. Specifically, the flat plate part 25 of the fixation member 24 is fixed to the battery cell cases 3 of the battery blocks 1 included in the battery modules 22, by appropriate fastening means such as bolts, screws or rivets, for example. As a result, the collection duct part 30 is closed, and functions as a collection duct into which the gas emitted from the battery cells 2 included in the battery modules 22 flows through the duct chambers 14. In this sense, it can be said that the fixation member 24 is a collection duct formation member. Here, it can be said that the cover members 8, 9 branching from the collection duct part 30 to both sides in the length direction L and forming the duct chambers 14 of the communicated battery modules 22 are branch duct formation members.

The exhaust duct part 32 of the fixation member 24 has, in the interior, a space that is a gas passage. At the leading end part of the exhaust duct part 32, a flange part 34 is provided. On the flange part 34, a plurality of through holes (or female screw holes), not illustrated, are formed. The flange part 34 is fastened to an upper wall 52 of the module case 50 by bolts or the like that are inserted into the through holes, and the fixation member 24 is thereby fixed to the module case 50. As a result, the battery unit 20 is fixed to the module case 50 through the fixation member 24. Here, the flange part 34 of the exhaust duct part 32 corresponds to the "attachment part including the exhaust duct" in the present invention.

Further, the first and second attachment parts 36, 40 of the fixation member 24 have attachment seat parts 37, 41 where the upper end parts are folded along the horizontal direction. On the attachment seat parts 37, 41, through holes (or female screw holes), not illustrated, are formed. Then, bolts or the like are inserted into the through holes and are fastened, thereby fixing the fixation member 24 to the upper wall 52 of the module case 50. As a result, the battery unit 20 is fixed to the module case 50 through the fixation member 24. Here, the first attachment part 36 and the second attachment part 40 correspond to the "attachment parts not including the exhaust duct" in the present invention.

In the fixation member 24, the first attachment part 36 and the second attachment part 40 are provided so as to be separated by a predetermined distance. Here, the "predetermined distance" only needs to be a distance that allows the electric component storage case 26 to be fixed, and specifically, only needs to be a distance that is slightly longer than the length in the width direction W of the electric component storage case 26. Further, in the first attachment part 36 and the second attachment part 40, attachment seat parts 38, 42 are respectively fixed by welding or the like, at positions that are on the side surfaces facing each other, and that are slightly separated in an upward direction from the flat plate part 25 of the fixation member 24. The electric component storage case 26 is then attached to the attachment seat parts 38, 42, by a method such as screw fixation.

The electric component storage case 26 contains a circuit board for controlling the charge and discharge of the battery cells 2 included in the battery modules 22 that constitute the battery unit 20, a junction box having therein conductors that are connected with non-illustrated output terminal sides of the battery modules 22, and the like. As shown in FIG. 3, the electric component storage case 26 is arranged on the flat plate part of the fixation member 24, by the intermediary of a gap 27. Such an arrangement inhibits the heat of the fixation member 24 from transferring to the electric component storage case 26, and prevents the internal electric components from being subject to thermal damage.

As shown in FIG. 3, on the upper wall 52 of the module case 50, an exhaust port 53 is formed at the connection position of the exhaust duct part 32. Then, an exhaust duct 54 on the side of an apparatus in which the battery unit 20 is installed, for example, a motor-driven vehicle, is coupled with the exhaust port 53. As a result, with this configuration, the gas emitted from the battery unit 20 through the exhaust duct part 32 is released to the exterior of the vehicle.

Further, in the module case 50, the battery unit 20 is fixed and supported by a bracket 58 provided on a bottom wall 56 of the module case 50. As a result, the fixation state of the battery unit 20 in the module case 50 becomes more stable.

The bracket 58 is formed of an insulating material such as resin, for example. As a result, in the case where the module case 50 is formed of an electrically conductive material such as, for example, a metal plate, it is possible to secure the insulation property between the battery unit 20 and the module case 50. However, without being limited to this, the bracket 58 may be formed as a member made of metal. Further, in the case where the battery unit 20 is fixed and supported while being hung by the exhaust duct part 32, first attachment part 36 and second attachment part 40 of the fixation member 24, the bracket 58 may be omitted.

Figure 6:
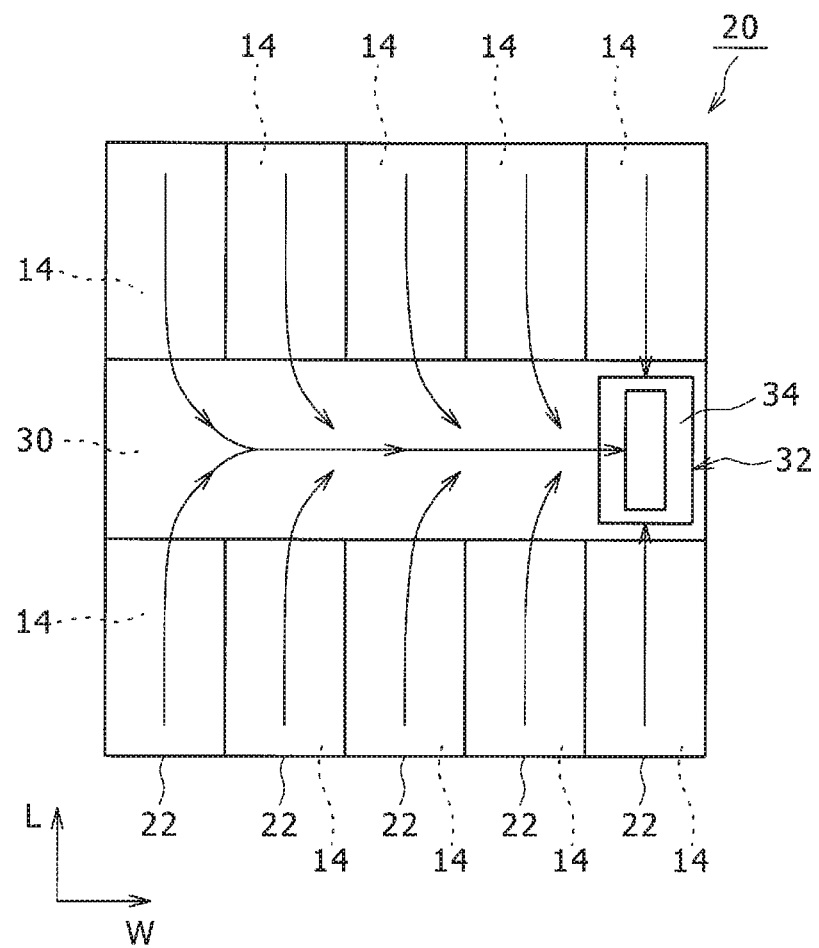
FIG. 6 is a schematic plan view of the battery unit showing the flow of gas in duct chambers of the battery unit.

Next, the exhaust operation and other operations of the battery unit 20 having the above configuration will be described with reference to FIG. 6. FIG. 6 is a schematic plan view of the battery unit 20 showing the flow of gas in the duct chambers 14 and collection duct part 30 of the battery unit 20. In FIG. 6, the illustration of the electric component storage case 26 is omitted.

As shown in FIG. 6, when the safety valve 13 provided in the battery cell 2 of the battery block 1 included in the battery module 22 operates, gas is emitted from the battery cell 2 into the duct chamber 14. Since the cover members 8, 9 close each duct chamber 14 at both end sides of each battery module 22, the gas emitted into the duct chamber 14 flows to the collection duct part 30 that is positioned at the center in the length direction L of the battery unit 20. Then, the gas flows through the collection duct part 30 in the width direction W, is ejected from the exhaust duct part 32 to the exterior of the unit, and is released from the exhaust duct 54 of the vehicle side to the exterior of the vehicle.

As described above, according to the battery unit 20 in the embodiment, the fixation member 24, which fixes the battery unit 20 including the plurality of battery modules 22 to the upper wall 52 of the module case 50, has the fixation function for the plurality of battery modules 22 and the exhaust function for the gas emitted from the battery cells. Therefore, compared to the case where these functions are implemented in separate structures, it is possible to reduce the size of the battery unit 20. As a result, it is possible to achieve space saving when it is installed in a vehicle in which the installation space is limited.

Further, in the battery unit 20 according to the embodiment, the flange part 34 is provided at the end part of the exhaust duct part 32 of the fixation member 24 and is fixed to the upper wall 52 of the module case 50, and it is thereby possible to perform the fixation of the exhaust duct and the fixation of the battery unit 20 simultaneously, resulting in an advantage in that the mounting work is facilitated.

Further, in the battery unit 20 according to the embodiment, the fixation member 24, which is formed by a metal plate having a good heat transfer property, has a function to release the heat generated in the battery module 22 to the module case 50 through the exhaust duct part 32, first attachment part 36 and second attachment part 40 of the fixation member 24. It is therefore possible to suppress the temperature rise of the battery module 22 and to reduce the performance variation of the battery cell 2 due to the temperature rise.

Further, in the battery unit 20 according to the embodiment, the flat plate part 25 constituting the fixation member 24 has a heat equalizing action to average the temperature differences among the battery modules, because it is formed by a metal plate having a good heat transfer property and is coupled across the plurality of battery modules 22 constituting the battery unit 20. As a result, it is possible to rectify or decrease the performance disparity among the battery modules 22 due to the temperature differences.

Furthermore, in the battery unit 20 according to the embodiment, the electric component storage case 26, in which the electric components for controlling the charge and discharge of the battery unit 20 are stored, is attached to the fixation member 24. It is therefore possible to easily attach the electric component case to the battery unit 20, without the need for a dedicated attachment component. Further, the electric component storage case 26 is thermally separated from the flat plate part 25 of the fixation member 24, by the intermediary of the gap 27, and therefore, it is possible to inhibit the internal electric components from being subject to thermal damage due to transfer of the heat of the fixation member 24 to the electric component storage case 26.

Here, the battery unit according to the present invention is not limited to the configuration of the above-described embodiment, and various modifications and improvements are possible in a range of the matters described in the claims and the equivalents.

In the above embodiment, it has been described that the exhaust duct part 32 of the fixation member 24 is coupled with the upper wall 52 of the module case 50. However, without being limited to this, for example, the exhaust duct part 32 may extend in the width direction W from the fixation member 24, and the exhaust may be performed from the side wall of the module case 50 to the exterior. Alternatively, the collection duct part 30 may extend downward from a side surface of the battery unit 20, the exhaust duct part 32 may be coupled with the bottom wall 56 of the module case 50, and the exhaust direction may be oriented downward.

Figure 7:
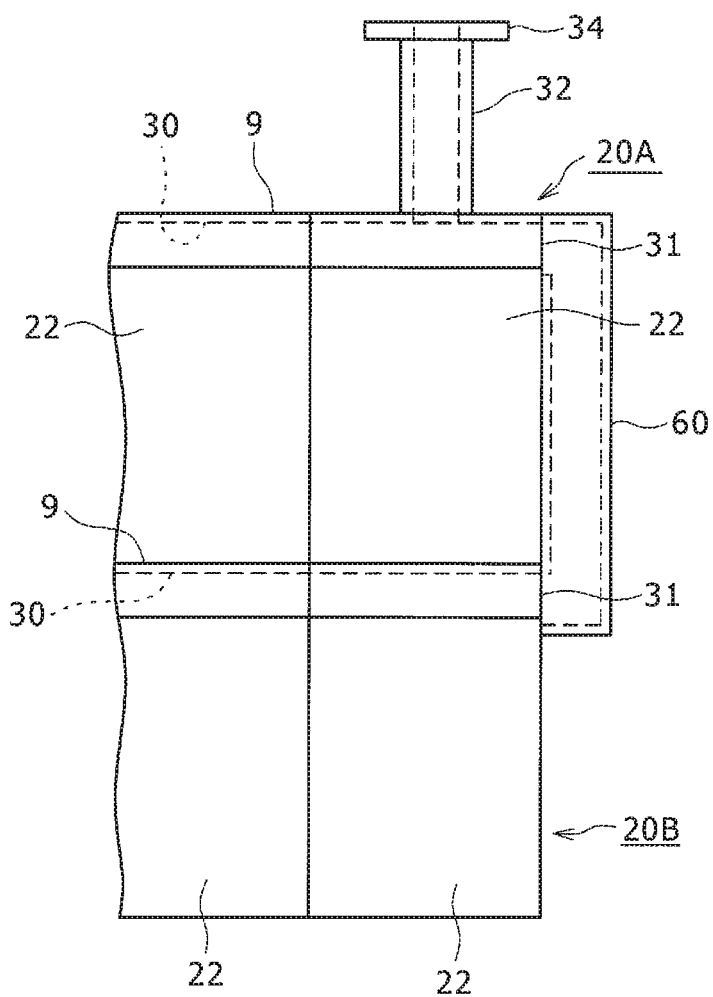
FIG. 7 is a side view showing a duct connection member when battery units are arranged so as to be stacked in two stages.

Further, as shown in FIG. 7, in the case where battery units 20A, 20B are installed so as to be vertically stacked, a configuration may be adopted in which the collection duct parts 30 of the battery units 20A, 20B are opened at end parts in the width direction W respectively, and these opening parts 31 are communicated by a connection member 60. It is therefore possible to lead the gas ejected from the collection duct part 30 of the battery unit 20B at the lower stage, to the battery unit 20A at the upper stage, and exhaust it from the exhaust duct part 32.

Moreover, a temperature fuse that fuses at a predetermined temperature (for example, about 100° C.) may be provided at the proximity of a duct outlet of the exhaust duct part 32 of the fixation member 24, and may detect the emission of the gas from the battery cell 2 in the battery unit 20.

REFERENCE SIGNS LIST 1 battery block, 2 battery cell, 3 battery cell case, 4 positive electrode side collector unit, 5 negative electrode side collector unit, 6, 7 holder, 8, 9 cover member, 9a coupling rib, 10 positive electrode side insulating plate, 11 positive electrode collector, 12 positive electrode plate, 13 safety valve, 14 duct chamber, 15 case member, 16 negative electrode side insulating plate, 17 negative electrode collector, 18 negative electrode plate, 20, 20A, 20B battery unit, 22 battery module, 24 fixation member, 25 flat plate part, 26 electric component storage case, 27 gap, 30 collection duct part, 31 opening part, 32 exhaust duct part, 34 flange part, 36 first attachment part, 40 second attachment part, 37, 38, 41, 42 attachment seat part, 50 module case, 52 upper wall, 53 exhaust port, 54 exhaust duct (on the vehicle side), 56 bottom wall, 58 bracket, 60 connection member, H height direction, L length direction, W width direction

The invention claimed is:

1. A battery unit comprising:
a storage case;
a plurality of battery modules in the storage case, each of which includes a plurality of battery cells connected with each other in parallel, and each of which has a duct chamber to exhaust gas emitted from each battery cell; and
a fixation member that fixes the plurality of battery modules to a wall part of the storage case while the plurality of battery modules are integrally combined,
wherein each duct chamber of the plurality of battery modules has an opening part to exhaust gas, the fixation member has a portion covering the opening part across the plurality of battery modules and an exhaust duct part, provided upright so as to protrude from the portion and having, in the interior, a space for collecting the gas emitted into the duct chamber of each battery module and exhausting the collected gas to the exterior of the storage case, and the exhaust duct part includes a tubular portion which has a tubular outer surface facing an inner surface of the storage case, the tubular portion surrounds the space, an edge portion of the tubular portion in a direction where the tubular portion extends in an inner space of the storage case from the portion covering the opening part toward the wall part of the storage case contacts with the inner surface of the wall part of the storage case,
the gas flows from the duct chamber through the opening part to the portion covering the opening part, further from the portion covering the opening part into the exhaust duct part, and is emitted from the exhaust duct part.

2. The battery unit according to claim 1,
wherein the exhaust duct part has a flange part at an end part on an opposite side of an end part on a side of the portion covering the opening part, and the flange part is attached to the wall part of the storage case.

3. The battery unit according to claim 1,
wherein the fixation member further has a first attachment part, provided upright from the portion covering the opening part, for fixing the battery unit to the storage case, and the fixation member is a metal plate.

4. The battery unit according to claim 1, further comprising
- an electric component storage case storing an electric component for controlling charge and discharge of the battery cells included in the battery modules,
- wherein the fixing member further has a first attachment part, provided upright from the portion covering the opening part, for fixing the battery unit to the storage case, the first attachment part has an attachment seat part separated from the battery modules between the battery modules and the storage case, and the electric component storage case is arranged on the attachment seat part.

5. The battery unit according to claim 4,
- wherein the fixing member further has a second attachment part, provided upright from the portion covering the opening part, for fixing the battery unit to the storage case, the second attachment part is provided so as to be separated from the first attachment part, the second attachment part has an attachment seat part separated from the battery modules between the battery modules and the storage case, and the electric component storage case is arranged on the attachment seat part of the second attachment part.

* * * * *